United States Patent [19]

Blount et al.

[11] Patent Number: 5,253,342
[45] Date of Patent: Oct. 12, 1993

[54] INTERMACHINE COMMUNICATION SERVICES

[75] Inventors: Marion L. Blount, Mahopac; Stephen P. Morgan, Hartsdale, both of N.Y.; Katalin A. V. Rader, Austin, Tex.; Robert K. Rader, Austin, Tex.; Amal A. Shaheen-Gouda, Austin, Tex.

[73] Assignee: International Business Machines Corporation, Armonk, N.Y.

[21] Appl. No.: 900,545

[22] Filed: Jun. 18, 1992

Related U.S. Application Data

[63] Continuation of Ser. No. 298,398, Jan. 18, 1989, abandoned.

[51] Int. Cl.⁵ .................................. G06F 13/00
[52] U.S. Cl. .................... 395/200; 364/DIG. 1; 364/239.6; 364/240.9; 364/284; 364/284.1; 364/284.3; 364/284.4
[58] Field of Search .................................... 395/200

[56] References Cited

U.S. PATENT DOCUMENTS

| | | | |
|---|---|---|---|
| 4,223,380 | 9/1980 | Antonaccio et al. | 364/200 |
| 4,646,300 | 2/1987 | Goodman et al. | 364/200 |
| 4,667,287 | 5/1987 | Allen et al. | 364/200 |
| 4,777,595 | 10/1988 | Strecker et al. | 364/200 |

Primary Examiner—Gareth D. Shaw
Assistant Examiner—Kakali Chaki
Attorney, Agent, or Firm—Wayne P. Bailey; Marilyn D. Smith

[57] ABSTRACT

A communication protocol for direct communications between operating system kernels of a plurality of processors in a clustered-type, shared virtual memory, multi-processor data processing system is disclosed. Each processor unit includes a intermachine communications software system ("IMCS") which may-be used by a trusted kernel of the operating system of the processor to communicate with a service in another processor, either directly or through an intermediate processor. Communications are initiated when a user prepares a message in accordance with pre-programmed instructions from the IMCS in a standard format. Once the message is prepared, the user calls IMCS which selects a route for the transmission of the message over a serial communications link to the receiving processor using a "request to send immediate" serial link level protocol. The message is initially directed to a common buffer pool. IMCS calls special software to read the header of the message to determine the identity of the destined server and to determine if the buffer in the buffer pool assigned to the called service has available buffer space to accept the message. If not, IMCS directs the sending of a negative acknowledgment to the sending processor. If sufficient buffer space is available, IMCS directs the sending of an acknowledgment to the sending processor. Upon receipt of the acknowledgment by the sending processor, IMCS calls a notification routine to inform the user of the status of the transmitted message.

26 Claims, 9 Drawing Sheets

INTERMACHINE COMMUNICATION SERVICES

This is a continuation of application Ser. No. 07/298,398 filed Jan. 18, 1989, now abandoned.

A portion of the disclosure of this patent document contains material which is subject to copyright protection. The copyright owner has no objection to the facsimile reproduction by anyone of the patent document or the patent disclosure, as it appears in The Patent and Trademark Office patent file or records, but otherwise reserves all copyright rights whatsoever.

FIELD OF INVENTION

This invention relates in general to communication protocols for a data processing system including multiple processors, and in particular, to a new lightweight communication protocol for allowing direct communication between kernels of a plurality of processors in a clustered-type, multi-processor data processing system.

RELATED APPLICATIONS

U.S. application Ser. No. 07/298,384, now U.S. Pat. No. 5,222,217 filed concurrently herewith in the name of Blount, et al, entitled "Using Recoverable Shared Virtual Storage" is directed to implementing reliable shared data structures, such as message queues, and system facilities in closely-coupled, multi-processor, "recoverable shared virtual memory" data processing systems.

U.S. applications Ser. No. 07/126,820, filed Nov. 30, 1987, now abandoned in the name of Blount, et al, entitled "Method for Maintaining System Availability in a Multiprocessor Data Processing System Employing a Shared Virtual Memory" is directed to a method of managing the shared virtual memory of a clustered-type multi-processor system to minimize a loss of data resulting from the failure of any single component of the configuration, and to maintain data consistency despite the plurality of processors.

U.S. application Ser. No. 06/819,458 filed Jan. 16, 1986, now Duvall, et al, U.S. Pat. No. 4,742,447, entitled "Method to Control I/O Accesses in a Multi-Tasking Virtual Memory Virtual Machine Type Data Processing System", is directed to a method for using a multi-user page-segmented virtual memory data processing system in which a mapped file data structure is selectively created to permit all I/O operations to the secondary storage devices to be executed by simple load and store instructions under the control of the page default handler.

U.S. application Ser. No. 07/127,000 filed Nov. 30, 1987, now abandoned in the name of Blount, et al, entitled "Method for Reducing Disk I/O Accesses in a Multi-processor Clustered/Type Data Processing System", is directed to a method for managing the storage of data in a shared virtual memory data processing system having a plurality of interconnected processor units, which permits a page fault which occurs in one processing unit to be serviced by transferring a copy of the requested page from the main memory of another processor unit whenever such a copy exists rather than performing an I/O paging operation to the disk file of the processor unit which experienced the page default.

BACKGROUND ART

The prior art discloses numerous communication protocols by which the processors in a multi-processor data processing system share information. The particular communication protocol employed depends on the particular design and operating constraints of the multi-processor system.

A multi-processor system configuration may be thought of as a plurality of processing units sharing a logical communications channel. The logical communications channel may take the form of memory shared among the processing units in which messages from one processing unit to another processing unit may be placed. Alternatively, the logical communication channels may take the form of a communications network through which messages from one processing unit to another processing unit may travel.

For communication purposes, such prior art multi-processor computer systems can be generally categorized as tightly-coupled systems, closely-coupled systems, and loosely-coupled or distributed multi-processor systems.

Tightly-coupled systems have identical processing units which are physically very close to each other, can access the same memory and run the same operating system. The communications media between them are extremely fast. They may consist of shared memory, or they may include signalling over proprietary buses or other methods specific to the computer system in question. The communications protocols used are also very specific, special-purpose protocols which may be entirely implemented in hardware, but in any case add very little overhead to the communication. The advantage of such a system is the ability to use several processors together to process the workload of the system.

Distributed systems are physically separated, by as little as a few feet or as much as thousands of miles. The communications medium is typically an industry standard such as telephone line, satellites, local area networks like Ethernet TM [1] or Token Ring TM [2]. The processors in a distributed system may be totally different from each other. Such systems frequently run entirely different operating systems and are entirely independent of each other, but cooperate to allow the sharing of data. They allow data to be distributed over more systems as the volume of data increases and to be duplicated in more than one system for higher availability. The communications protocols used by such distributed systems tend also to be industry standards, such as Systems Network Architecture ("SNA TM ")[3] or Transmission Control Protocol and Internet Protocol ("TCP/IP").

[1] Ethernet is a registered trademark of Xerox Corporation.
[2] Token Ring is a trademark of IBM Corporation.
[3] SNA is a trademark of IBM Corporation.

Closely-coupled or "clustered" systems attempt to combine the advantages of the two other organizations. They are typically at least in the same building, if not the same room, and may use either a standard communications medium such as Ethernet or a special-purpose one such as Digital Equipment Corporation's cluster interconnect bus. The processors are usually similar and compatible with each other. They run the same operating system in each machine and they cooperate far more closely than in distributed systems, to allow other facilities besides data sharing. The goal is generally to give the user the illusion of a single system.

More recently, a proposal to interconnect a plurality of virtual memory data processing units in a clustered configuration was disclosed in a paper entitled "Memory Coherence in Shared Virtual Storage Systems"

authored by Kai Li and Paul Hudak and presented at the *Fifth Annual Association for Computing Machinery Symposium on Principles of Distributed Computing*, 1986. In the proposed cluster of machines, all the units have the same type of operating system and can address the same virtual memory space.

Each unit of the clustered configuration therefore shares the set of addresses in its virtual memory system with the other units in the configuration and the page fault handling mechanism is extended to fetch pages from other units as well as from that processor's secondary storage. When a unit of such a clustered system suffers a page fault, it is possible to handle the page fault by requesting a copy of the page from another unit rather than from secondary storage. This has the advantage that the other unit may have the page in its memory, and can respond far faster than a secondary storage device can. It can be seen that there may be copies of a given page in several units of such a cluster, so a unit which suffers a page fault may not know where to request a copy of the page. Further, unless special steps are taken, anomalies, such as two units changing a page at the same time, may occur. Also, it is important to ensure that when a page is read, the results of the most recent write operation are seen, even though the reader and writer may be in physically separate processors. In order for this kind of sharing to work properly, a system protocol may be established to do such things as grant permission to change a page, find the owner of the page, and determine when to return a page to the owner. This kind of system protocol involves a great deal of communication between the systems in the various units.

In the past, numerous standard communications protocols have been developed for transmitting information between remote processors, including the SNA developed by IBM Corporation and numerous specific protocols for use with SNA as exemplified by the "document interchange protocol" described in U.S. Pat. Nos. 4,648,061 and 4,532,588.

A fundamental problem in communication systems which must be addressed by communication protocols is whether there is sufficient buffer space in the memory of the receiving processor to receive the message. In protocols typically used in the past in distributed systems, even if there is not sufficient buffer space, n acknowledgement (ACK) at the communications link level has already been sent to the sending processor by the receiving processor which informs the sending processor that the message was successfully received. The communications link level acknowledgment or "ACK" is normally sent by hardware such as a communications link adapter or by lower levels of software. Even though the link level "ACK" has been sent informing the sending processor that the message was successfully received by the receiving processor, the message must be discarded by the receiving processor if there is not sufficient buffer space available in the receiving processor for the message. Thus, at a higher software level, another message has to be sent by the receiving processor to the sending processor that the message had to be discarded or that there were no buffers available for the message received. This fundamental problem has created the necessity of employing complex hardware and software architecture such as SNA, especially in a distributed data processing system.

In loosely-coupled, multi-processor configurations disclosed in the prior art which employ a message-passing model, the individual kernels running on separate processing units send messages containing requests for service to other processing units within the configuration that manage configuration-wide shared resources. Reliance on a "message-passing" model has undoubtedly occurred because message passing corresponds naturally to the underlying communications connections among the processing units, which is generally believed to compose the primary performance bottleneck in a loosely-coupled configuration; however, message passing as a model for system coupling has several drawbacks.

The difficult of directly sharing complex data structures (e.g. control blocks containing pointers) among processors in message passing systems is well-known and is discussed in a paper entitled "A Value Transmission Method For Abstract Data Types" by M. Herlihy and B. Liskov and published in the ACM Transactions on Programming Languages and Systems, Vol. 4, No. 4 in October of 1982, which is herein incorporated by reference. This subject is further discussed in a doctoral thesis entitled "Remote Procedure Call", by B. Nelson, and published by Carnegie Mellon University in May of 1981, incorporated herein by reference.

In order to share a list of elements between two components of an operating system executing on separate processing units within a multi-processor configuration, which is itself a relatively common requirement, the elements have to be packed into a format suitable for transmission at the sending component, transmitted from the sending component to the receiving component, then unpacked at the receiving component. This sequence of operations is inefficient in processor utilization.

More importantly, this sequence of operations is complex and unwieldy. The primary drawback of message passing is that it forces both the sending and receiving components into awkward and complex architectures that tend to be costly and difficult to implement, debug, augment, and maintain. Since the kernel of a typical general purpose operating system tends to be composed of many interacting components, the implications of designing the operating system of a multi-processor configuration around a message passing model tend to be large.

In a clustered-type configuration where the plurality of units share virtual memory similar to tightly-coupled units, a communications protocol is needed to effect rapid transfers between the kernels of the operating system in the various units. The selected protocol should address the high level of communications traffic associated with such issues as: obtaining a page from the shared virtual memory in the event of a page fault, how to manage concurrent requests for the same page if one unit wants to write to that page while other units want to read from that page, and various other situations that are common to functions that share stored data. As previously noted, standard communication protocols which have been developed in the past for loosely-coupled distributed computer systems can impose significant overhead for communications in terms of the number of instructions necessary to transmit the data from one unit to another, thereby effectively cancelling out the potential benefits of having a shared virtual memory cluster of data processors.

Accordingly, the present invention is directed to a novel, lightweight communications protocol designed to allow trusted kernels of the operating systems of the processors in a clustered-type multi-processor system to

SUMMARY OF THE INVENTION

The present invention discloses a new and improved communications system for communicating between a plurality of individual processors. The protocol includes a mechanism in the sending processor for sending a message from a component in a sending processor to a component in the receiving processor, a means in the receiving processor for dynamically determining at the time the message is received the availability of buffer space for the destined component at the receiving processor, and a mechanism in the receiving processor for sending an acknowledgment to the sending processor that the message was received by the receiving processor and that sufficient buffer space is available for storing the message for the destined component or for sending a negative acknowledgment that there is not sufficient buffer space. The protocol also includes software in the sending processor for notifying the sending component of the determination by the receiving processor that sufficient buffer space was available at the receiving processor to receive the message.

The message sent by the sending processor contains both a control segment and a data segment from the user. Once the message is formatted, the sending processor preferably sends the message serially from the sending processor to the receiving processor. The protocol mechanism in the sending processor includes a routine for queuing the message at the sending processor, without any notification to the sending component if a positive acknowledgment is not received from the receiving processor. The receiving processor also includes a mechanism to notify the sending processor that the receiving component has buffer space available to receive the queued message when buffer space becomes available.

The system at the receiving processor includes a buffer pool for storing messages arriving at the receiving processor, wherein a part of the buffer pool is committed to each of the plurality of components in the receiving processor. The system also maintains accounts for the portion of the buffer space committed to each component which is available for arriving messages.

Preferably, the communication system divides the components in the receiving processor into a first and second class, wherein each component in the first class has a separate buffer pool committed to it from the buffer pool committed to the second class. Buffers in the "liberal" buffer pool committed to a particular component in the "liberal" class may be transferred to the buffer space committed to another component within the liberal class in response to a determination that there is not sufficient space for the message in the portion of the liberal buffer pool committed to the destined component. Buffers in the "strict" buffer pool committed to a particular component in the "strict" class may not be transferred to the buffer space committed to another component.

In the receiving processor, an interrupt handler which has means for accessing a plurality of services calls the interrupt handler extension associated with a destined component when a message of interest to the destined component arrives at the receiving processor and there is sufficient space available to the destined component.

In an alternative embodiment, the communications protocol communicates between a sending processor and a receiving processor through an intermediate processor in the network, wherein the protocol mechanism in the sending processor sends the message to the intermediate processor over a first communications link. The intermediate processor receives the message and retransmits the message over a second communications link to the receiving processor. The receiving processor then determines whether there is an availability of buffer space for the destined component at the receiving processor for the message. If sufficient buffer space is available, an acknowledgment is sent by the receiving processor to the intermediate processor that there was sufficient buffer space at the receiving processor. In response to the receipt of an acknowledgment by the intermediate processor, the intermediate processor sends an acknowledgment to the sending processor-that sufficient buffer space was available at the receiving processor.

In the event the receiving processor sends a negative acknowledgment to the intermediate processor that there is an unavailability of sufficient storage space at the receiving processor, the intermediate processor sends a negative acknowledgment to the sending processor that there is not sufficient buffer space at the receiving processor.

DESCRIPTION OF THE PREFERRED EMBODIMENT

Figure 1:
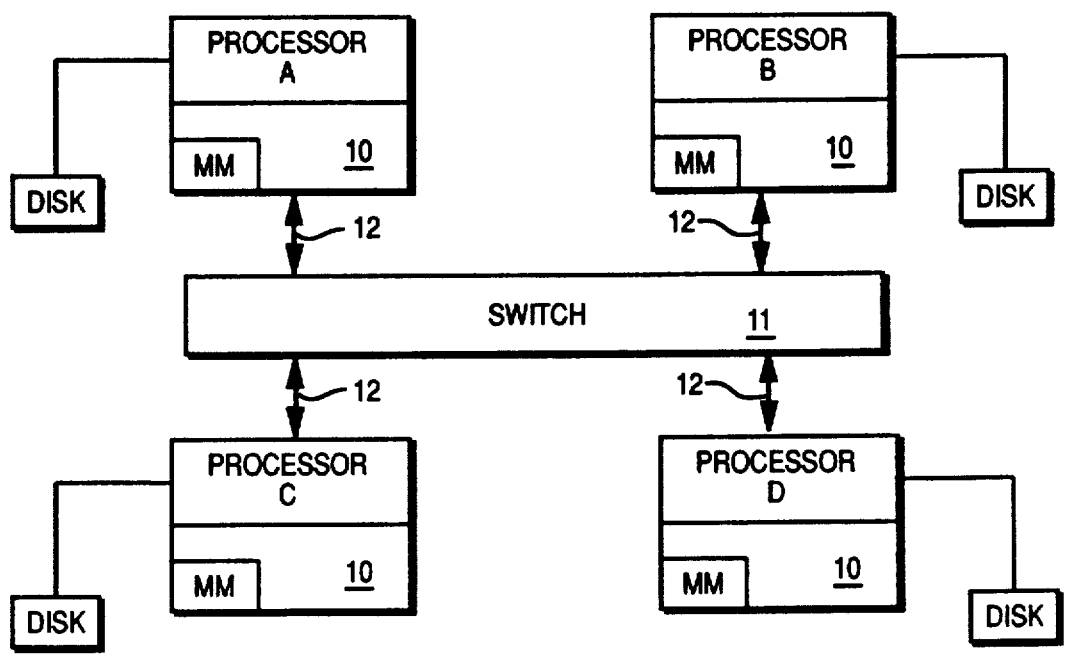
FIG. 1 is a functional block diagram of a plurality of processor units interconnected in a clustered configuration through a high-speed switch in which the communications protocol of the present invention may be advantageously employed.

FIG. 1 is a block diagram of a multi-processor clustered-configured data processing system in which the communications system of the present invention may be advantageously employed. As shown in FIG. 1, the multi-processor cluster comprises a plurality of processor units 10, a switch 11 and a plurality of communications links 12, each of which connects one processor unit 10 to switch 11. The function of switch 11 is to permit any processor unit 10 to communicate with any other processor unit 10. Although only processors 10A, 10B, 10C and 10D are shown, the actual number of processors in the network can be many more.

The specific details of a suitable high-speed switch for use with the communication system and multi-processor cluster disclosed herein are not considered relevant to an understanding of the present invention. Examples of a suitable switching arrangement which may be used may be found in U.S. Pat. Nos. 4,635,250 and 4,605,928.

Figure 2:
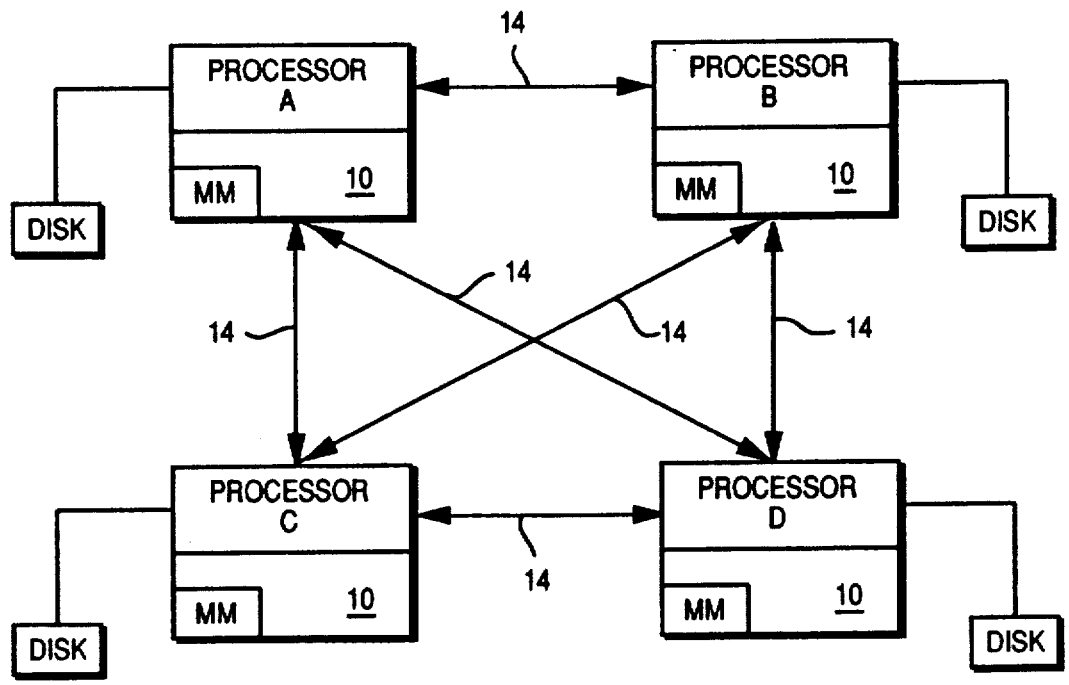
FIG. 2 is a functional block diagram of an alternative configuration of a plurality of processor units connected to each other by a communications link, whereby a processor communicates directly to any other processor in the clustered configuration.

FIG. 2 illustrates an alternative configuration of a clustered-configured, multi-processor data processing system in which the communications protocol may be employed. As shown in FIG. 2, the plurality of processor units 10 are connected to each other by a communication link 14.

Figure 3:
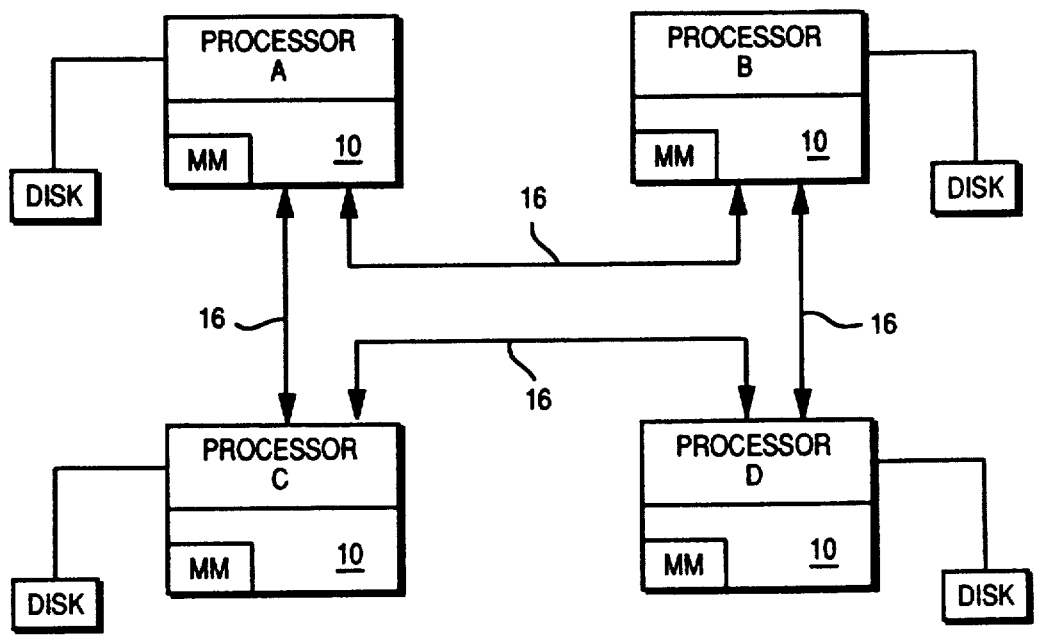
FIG. 3 is a functional block diagram of another alternative configuration of a plurality of processor units interconnected in a clustered configuration whereby a processor communicates to a non-adjacent processor through an intermediate processor.

FIG. 3 illustrates another configuration of a multi-processor cluster in which the communications system of the present invention may be advantageously utilized by a unit 10 to communicate with another non-adjacent unit 10, e.g. unit 10A communicates with a non-adjacent unit 10D through a unit 10B over communication link 16 from unit 10A to 10B and over another communication link 16 from 10B to 10D, as will be described in more detail below.

Figure 4:
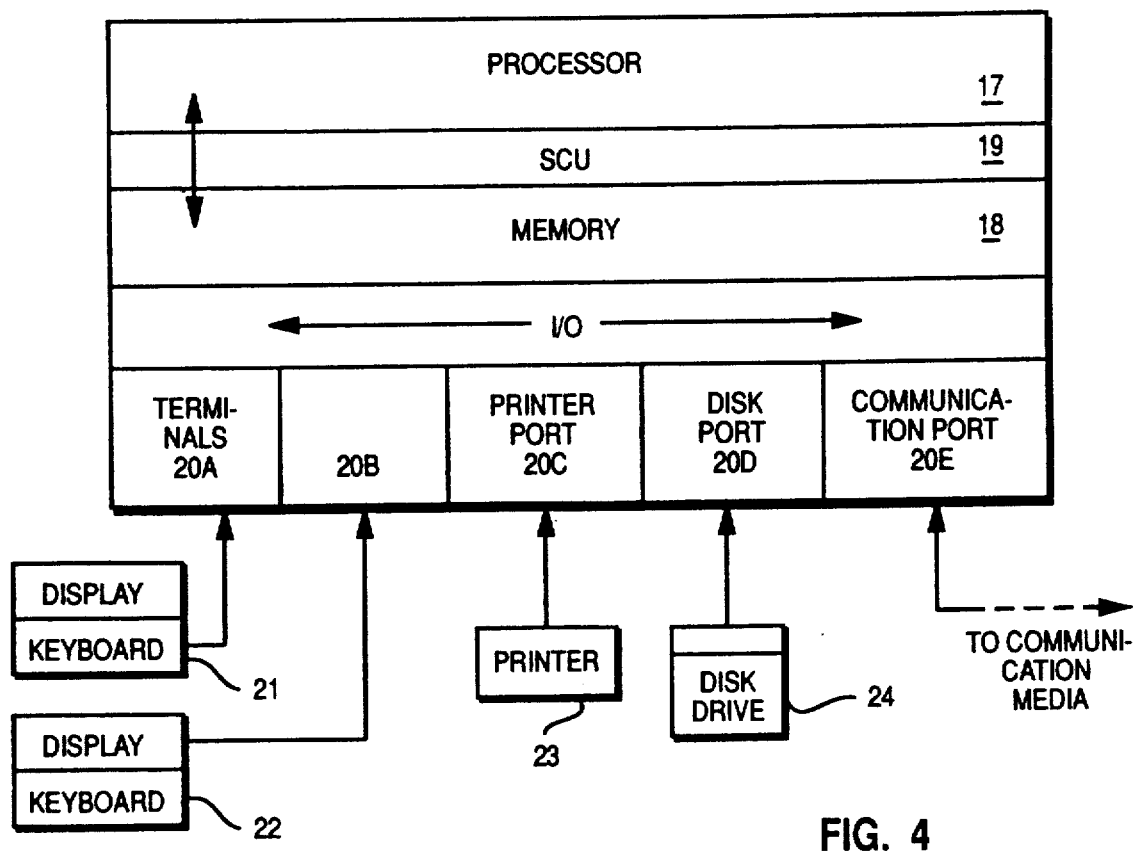
FIG. 4 is a block diagram of the processor units shown in FIGS. 1, 2 and 3, illustrating the various hardware functions that are incorporated into one of the units.

In FIG. 4, the processor unit 10 shown in FIGS. 1, 2 and 3 is disclosed in more detail. Processor unit 10 may be a high-function personal computer or an engineering work station, having 801 architecture running on the IBM AIX TM [4] operating system. It should be noted, however, that other architectures and operating systems may be employed in practicing the invention.

[4] AIX is a trademark of IBM Corporation.

The processor unit 10, may comprise a processor 17, main memory 18, a storage control unit 19, which controls the transfer of data between the processor 17 and memory 18, and a plurality of input/output ports 20A-20E. Ports 20A and 20B function to connect display type terminals 21 and 22 to the processor unit 10. Port 20C connects a printer 23 to the processor 10 while port 20D connects disk drive 24 to the processor.

A communication input/output adapter 15, preferably a serial link adapter or SLA, is employed to connect the port 20E of the processor unit 10 to the communications link 12 in FIG. 1, to communications link 14 in FIG. 2, or to the communications link 16 in FIG. 3 so that the processor can transfer data rapidly directly to another processor (FIG. 2), through the switch to another processor (FIG. 1), or through an intermediate processor to a non-adjacent processor (FIG. 3). Hereinafter all references to communications link shall be to communications link 12 for convenience.

The preferred communications link 12, is a serial link. The serial link 12 includes a fiber optic cable 13 (FIG. 5) and a S; 15 at each end thereof to interconnect to the respective ports 20E of processors 10. The fiber optic cable or link 13 transfers messages up to 64 k bytes in length at 200 Mbits/second or higher speed. The link fetches the data from the memory of one processor and deposits it in the memory of another processor. Tag words which control the memory accesses provide a scatter/gather capability on 64 byte boundaries. The serial link adapter 15 implements a link level device protocol which ensures that the data transfer takes place correctly. There are two protocols which can be used with the link 13. These are referred to as Request—to—send—immediate (RTSI) and Request—to—send/Request—to—receive (RTS/RTR).

RTSI is more efficient in that, if a receiving adapter is set up in advance, the data is delivered into memory without further software intervention. RTS/RTR allows the data to be delivered to suitable memory locations, but at the cost of an extra interrupt and software setup of the receiving adapter. RTSI is more suitable for short, frequent messages where efficiency is more important; RTS/RTR is more suitable for longer messages where the extra overhead can be amortized over a longer data transfer.

Processor unit 10 may correspond generally to the virtual memory data processing system that is described in detail in cross-referenced U.S. patent application Ser. No. 06/819,458. As described in that application, the processor has a 32 bit effective address that is converted into a 40 bit virtual address by employing the four higher order bits 31-28 to select one of sixteen segment registers, each of which stores a 12 bit segment address that defines one of 4,096 unique segments. Each segment comprises 256 megabytes of storage. If the page includes 2 K bytes of data, then a segment contains 128 K pages. On the other hand, if a page includes 4 K bytes of data, the segment then has 64 K pages or, more precisely 64 K virtual addresses which may be used to identify pages of data that are currently assigned to that segment. It should be noted, however, that the communications protocol of the present invention may be adapted to work with other types of processors.

Figure 5:
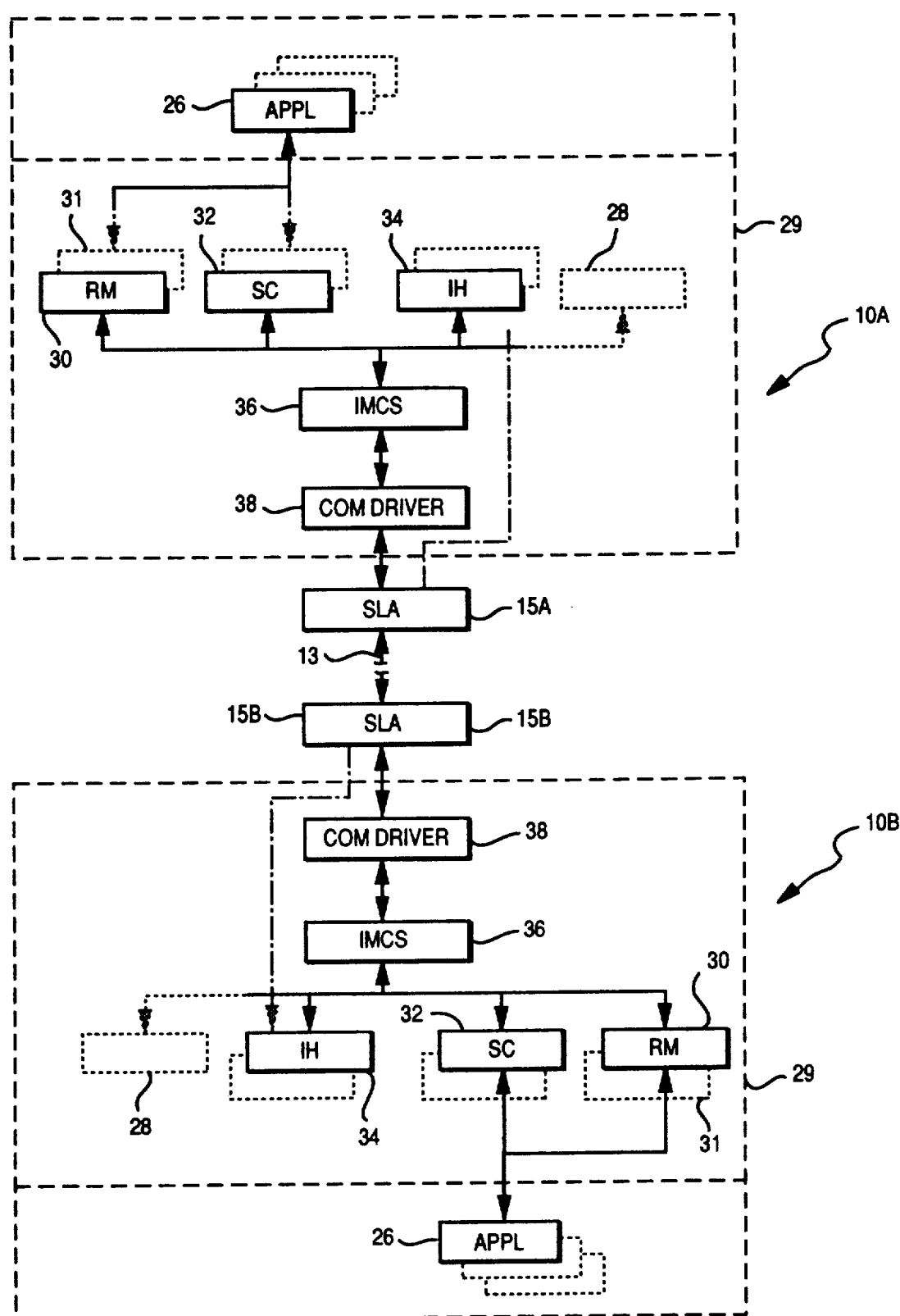
FIG. 5 is a block diagram of two of the processing units shown in FIG. 1 illustrating the various software functions that are incorporated in each unit and the communications link for sending messages between them.

In FIG. 5, the software resources associated with each processor 10 may include a plurality of applications software 26 built on top of a plurality of operating system services 28 in the operating system 29. These system services 28 include various resource managers 30, which allocate the hardware resources of unit 10, system calls 32 which service the requests of applications software 26 for services such as file access, and interrupt handlers 34 which react to asynchronous events such as the completion of an input/output event. Resource managers 30 may include a lock manager or a virtual memory manager 31.

These essential system services 28 are commonly described as being part of the kernel of the operating system 29. The kernel typically includes only the basic functions of the operating system 29 without which the operating system is not available or which may affect all the users or the state of the system and are hence privileged. Hence, the kernel must be reliable and access to the kernel must be controlled. There are other operating system components, such as compilers and utilities, which do not require privileges to perform their services. As a result, they are not part of the kernel.

In the shared virtual storage multi-processor system disclosed in more detail in FIG. 5, the various components of unit 10A and 10B will be distinguished by using the letter associated with the designation for each unit, e.g. VMM 31A of unit 10A.

A client program, such as an applications program 26A on unit 10A, may request data from memory. If the SCU 19A determines that the requested data is not in main memory 18A of unit 10A, a page fault occurs and the SCU 19A causes the page fault handling mechanism in the virtual memory manager 31A to locate and retrieve the data from the disk drive 24 associated with unit 10A or from another unit 10, which may have the data stored either in its main memory 18 or on a disk 24 associated with such unit. The virtual memory manager 31A may locate this memory in the manner described in cross-referenced copending U.S. patent application No. 07/127,000 which is incorporated herein by reference.

Although the virtual memory manager 31A of unit 10A could establish communication with the virtual memory manager 31 of another unit 10 to obtain the requested data through the use of a higher level communications protocol such as SNA or a local area network protocol, the use of such a high level communication protocol is too complex and slow, given the high volume of kernel-to-kernel traffic required to support a multi-processor clustered-type data processing system employing shared virtual storage.

With the system of the present invention (FIG. 5), the operating system 29 of each unit 10 includes a novel intermachine communications software system ("IMCS") 36. IMCS 36 may be used by a kernel component of the operating system 29 in one processor unit 10, such as the virtual memory manager 31, to send and/or retrieve data from a receiving component of another processor unit 10B, such as VMM 31B, through communications driver 38 and SLA 15 over the serial link 13 in a more rapid manner. Although the primary use of IMCS 36 is for a kernel component of the operating system 29 of one unit 10 of a clustered-type data processing system to send messages to or receive messages from a kernel component of the operating system 29 of another unit 10 in the cluster, it should be noted that other system components of the cluster could use IMCS to transmit or receive messages if they have a trusted interface to IMCS's services.

Figure 6A:
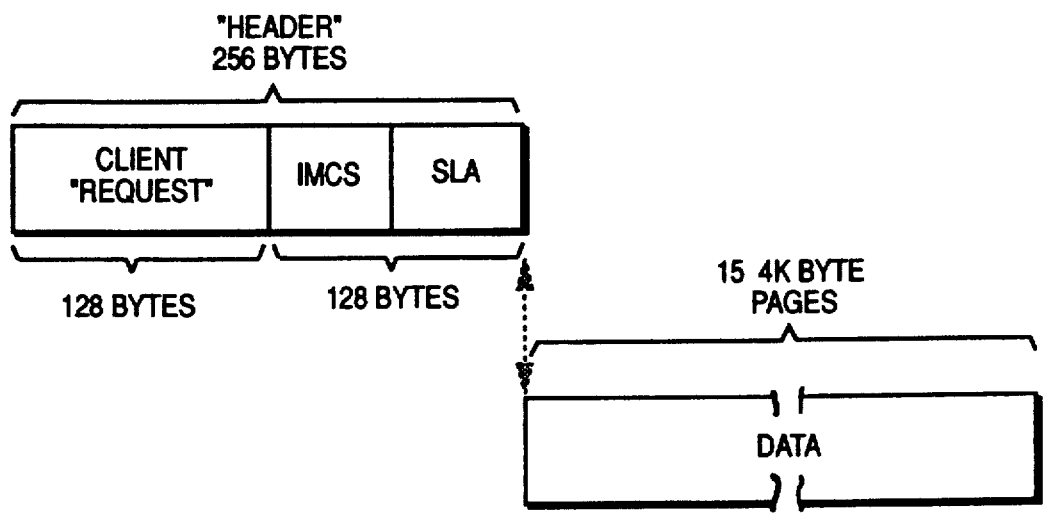
FIG. 6A illustrates the data structure of the header of the message and a separate data portion as stored in the sending processor in accordance with the communications protocol of the present invention.
Figure 7A:
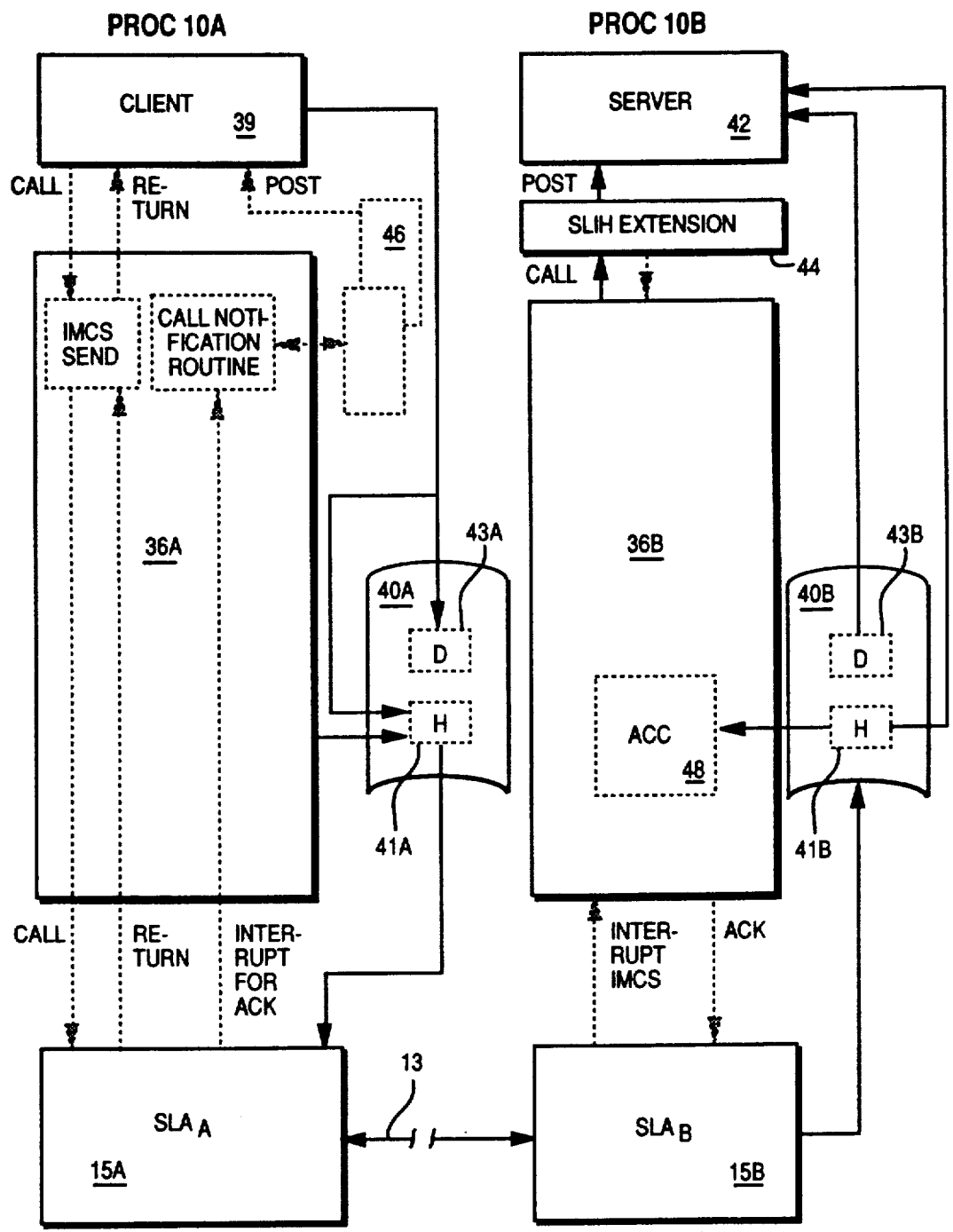
FIGS. 7A and 7B illustrate the communication protocol steps in sending a message between components of remote units.
Figure 7B:
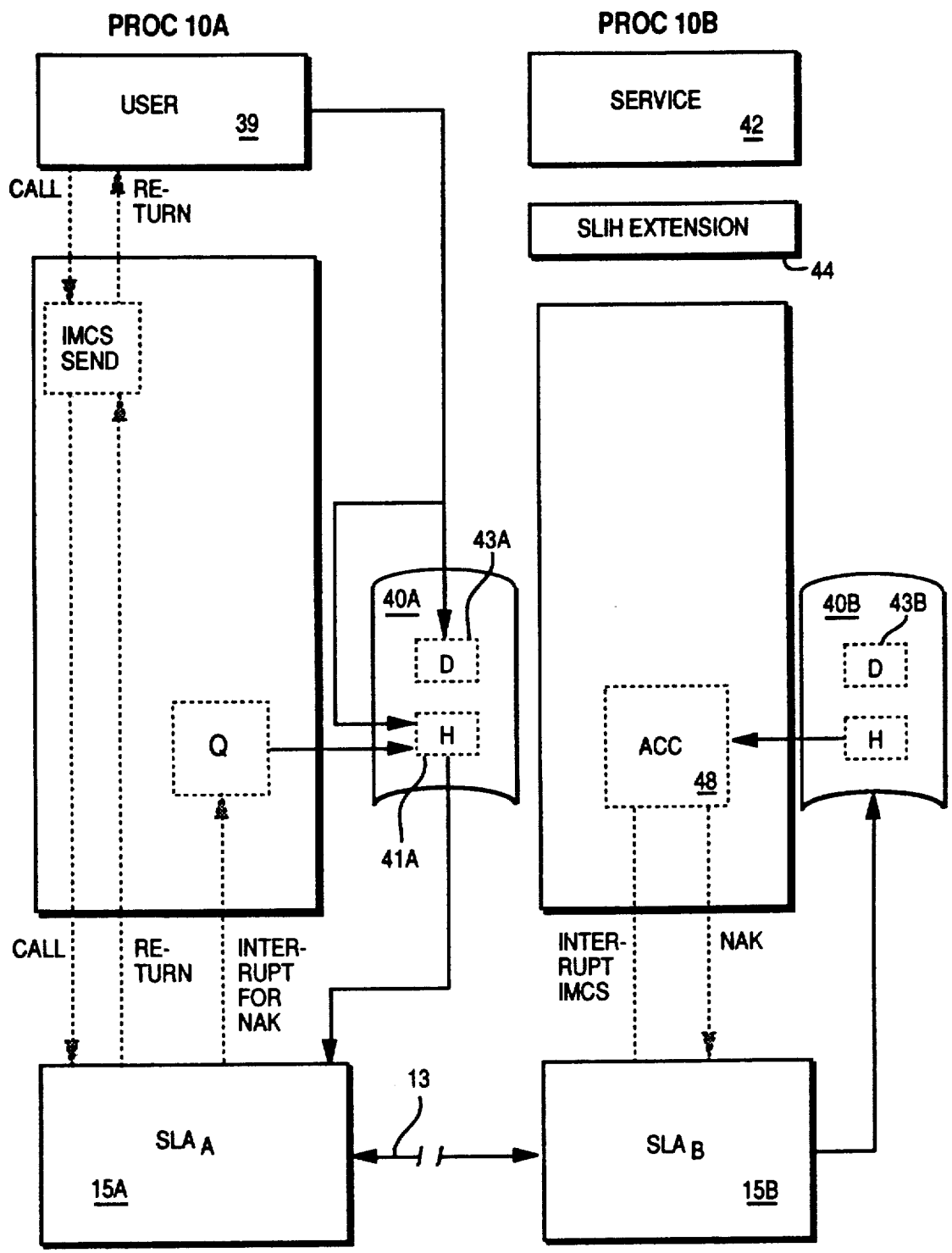
Figure 8A:
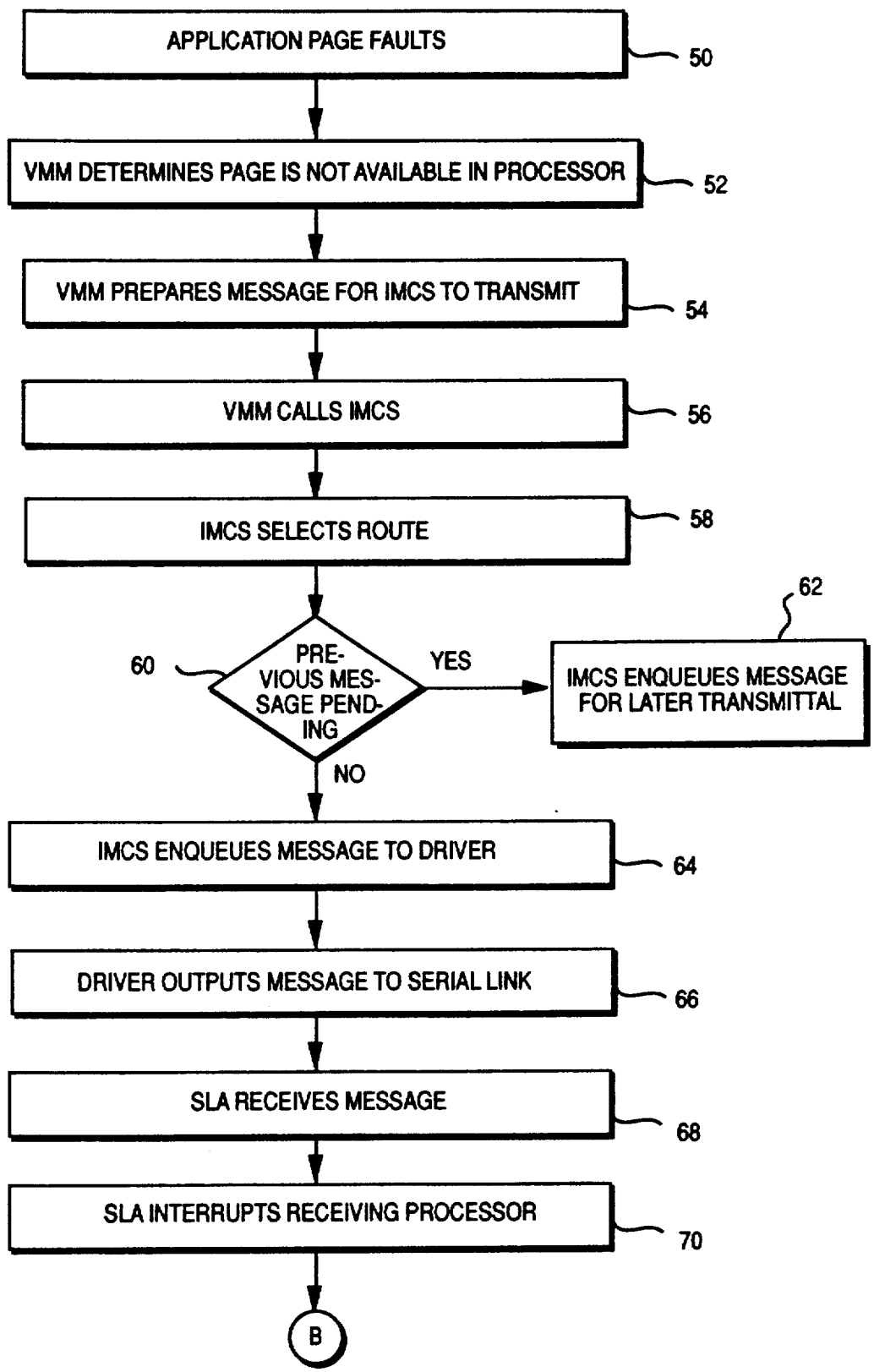
FIGS. 8A, 8B and 8C contain a flow diagram that describes the steps that are performed by the processors in using the communications protocol of the present invention.
Figure 8B:
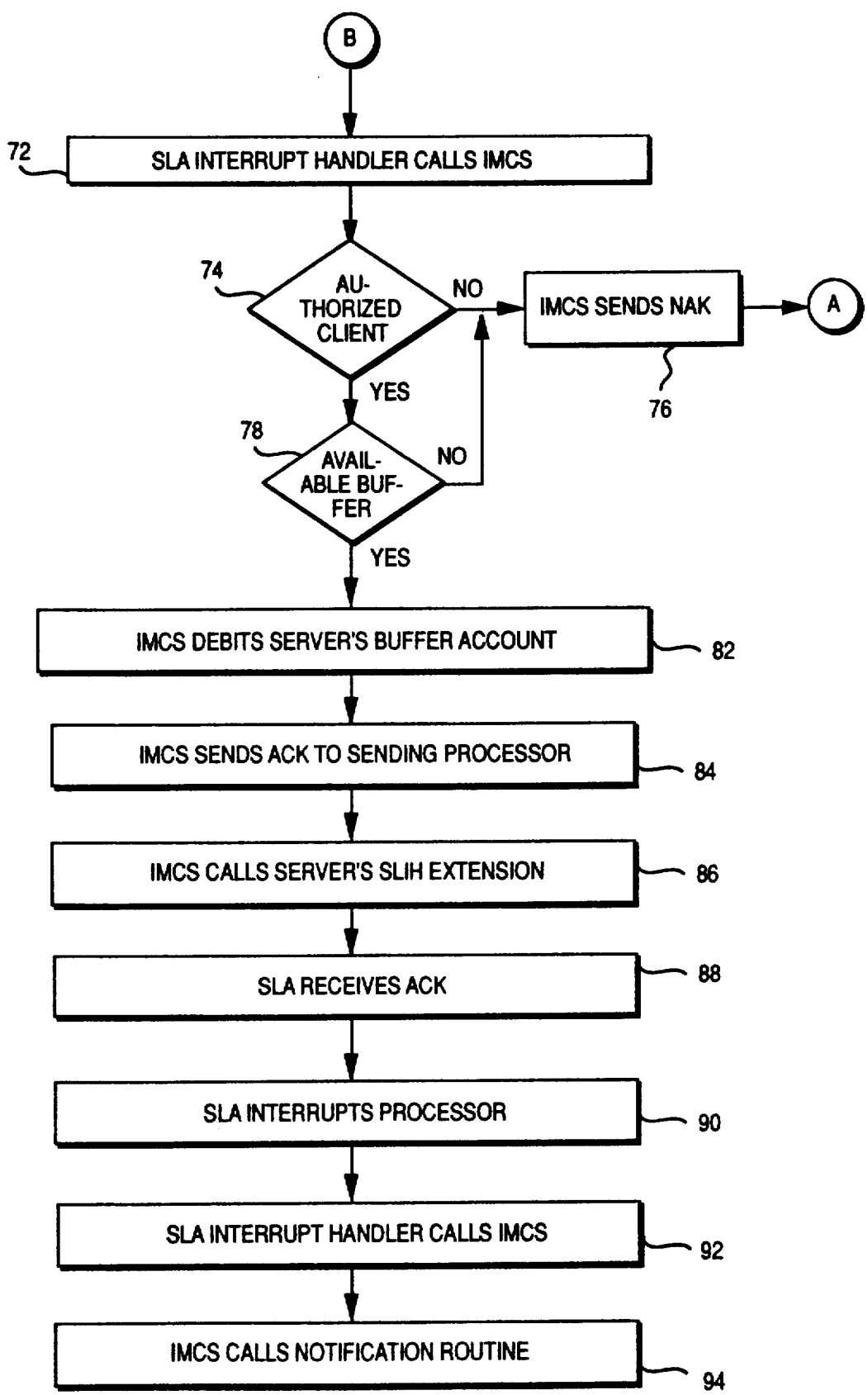
Figure 8C:
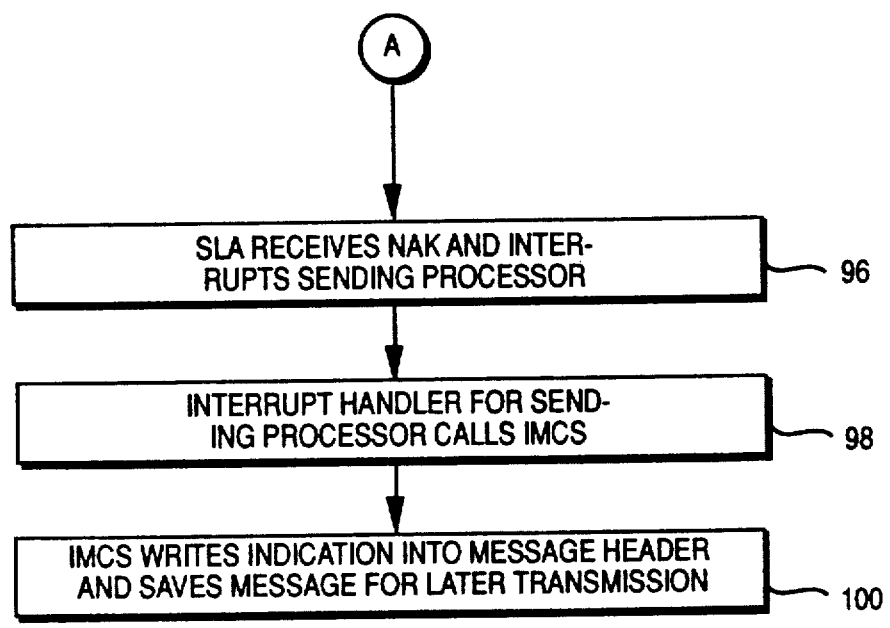

The steps involved in the implementation of IMCS for a typical type of intracluster communication are shown in FIGS. 8A, 8B, and 8C and the relationship between IMCS and other processor components is shown in FIGS. 7A and 7B. In step 50 (FIG. 8), an application 26A in unit 10A may request data from memory and page fault, or it may request some other service. In step 52, the page fault handler of VMM 31A determines that the data is not available to its processor 10A and is controlled by another processor 10B. In step 54, the page fault handler becomes a client 39 of IMCS and prepares a message for IMCS 36A to transmit. This IMCS message must be prepared in a standard format which contains both the message from the client 39, i.e. the page fault handler, to the virtual memory manager 31B of unit 10B or the server 42, and the information required by IMCS 36A to effect transfer of the message and any associated data to be sent which is required by the server 42 in processor 10B to perform the service requested by the client 39 in unit 10A. The format of this message is shown in FIG. 6A and is described in detail hereinafter.

Once the message is prepared by the client, in step 56, the client 39 calls IMCS 36A. In step 58, IMCS 36A selects a route for the transmission of the message and prepares program instructions for the communications channel selected. In step 60, it determines whether to enqueue the message to the communications channel driver 38 of the serial communication link selected, or to enqueue the message for later transmission, depending on the status of the previous message to the same server 42, as is described in more detail later. In the event the message is queued to the driver 38, in step 64, the driver 38 outputs the message through the communication port 20E, the serial link adapter 15B, over serial link 13 to a receiving processor unit 10B, using the "Request to Send Immediate (RTSI)" serial link level protocol.

The RTSI link level protocol includes an ACK which the SLA 15 can generate automatically when a correct data transfer has taken place. IMCS 36B instructs the SLA 15B not to generate the ACK automatically. Instead, IMCS 36B in unit 10B generates the ACK or NAK for transmission by the SLA 15B over the link 12, based on its determination of the availability of buffer space in the receiving processor 10B for the server 42.

IMCS allows the transfer of both control information and the associated data in a single message. This is an "in-band" signalling technique which requires the receiving processor 10B to distinguish between the control information and the data. Such control information includes, for example, a disk read, disk write or other "request", which describes the operation to be performed and contains pointers to the data to be read or written.

In step 68, the transmitted message is received by the receiving SLA 15B. The SLA 15B delivers the message into a buffer 40B, containing a pool of common buffer space previously assigned to IMCS 36B of the receiving unit 10B by the various kernel components of the receiving unit.

When the message arrives, the header occupies a 256 byte area in the kernel data segment 41B of buffer 40B, and the data occupies frames 43B of memory belonging to the serial link adapter 15B. The scatter/gather capabilities of the serial link adapter 15 are used to separate physically the header and data in the receiving processor 10. Thus the data, which may well consist of pages, is page aligned.

In step 70, the SLA 15B generates an interrupt to the processor 10B, which is handled by the processor in a conventional manner. In step 72, the second level interrupt handler ("SLIH") for the SLA 15B calls IMCS 36B.

A server 42, such as the VMM 31B, informs IMCS 36B of its existence before any messages can be delivered to it. The IMCS 36 in each processor unit 10 maintains a server table which contains, for each server, information about its header and data buffer accounts, the address of a routine to be called when a message arrives, and the categories of clients from which it will take messages. IMCS in each unit also maintains a list of cluster members.

In step 74, IMCS 36B reads the header of the message previously stored in the buffer 40B to determine the identity of the server 42 in the receiving processor 10B and determines if the sending processor 10A is allowed to send messages to the server in the receiving processor 10B by examining its server table entry and the cluster membership list. In step 76, IMCS 36B directs the SLA 15B to send a NAK to the sending processor 10A if it does not have authorization. In step 78, if there is authorization, IMCS 36B determines if the server 42 has enough buffer storage to accept the message. If not, in step 76, IMCS 36B directs the serial link adapter 15B to send a negative acknowledgement or "NAK". If the server 42 has sufficient buffer space committed to IMCS, in step 82, IMCS 36B debits the designated server's buffer "account". In step 84, IMCS 36B directs the serial link adapter 15B to send an ACK to sending processor unit 10A.

In the event IMCS 36 in the receiving processor directs the SLA 15 to send a NAK due either to a lack of buffer space or due to lack of authorization, the message stored in the buffer space 40B in the receiving processor is discarded.

In step 86, IMCS 36B calls the routine specified in the server table, which is called the SLIH extension 44, for the particular server 42 called. Briefly, the SLIH extension 44 is a special routine supplied by the server 42 which performs preliminary processing of the message received in the buffer space 40B reserved for IMCS 36B. This preliminary processing is to insure that the existence and location of the message is known to the server 42, as is described in more detail later.

In step 88, the ACK transmitted by the processor 10B is received by the SLA 15A of processor 10A. In step 90, the SLA 15A interrupts processor unit 10A.

In step 92, the interrupt handler for the SLA 15A calls IMCS 36A. In step 94, IMCS 36A calls a notification routine 46 specified in the message just transmitted. A notification routine 46 is provided by each client which sends a message using IMCS and its address is specified in each message. Each notification routine performs client-specific processing which may be required, e.g. returning the space occupied by the header or unpinning the data pages previously transmitted.

Returning to step 74 (also see FIG. 7B), if IMCS 36B in the receiving processor determines that the sending processor 10A is not allowed to send messages to server 42 in the receiving processor 10B, then, in step 76, IMCS 36B directs SLA 15B to send a NAK to the sending processor 10A. Similarly, in step 78, if IMCS 36B determines that the server 42 does not have enough buffers to accept the message, IMCS 36B also directs the SLA 15B to send a NAK.

In step 96, the SLA 15A receives the NAK and interrupts the processor unit 10A, as shown in FIG. 7B. In step 98, the interrupt handler for SLA 15A calls IMCS 36A. In step 100, IMCS 36A writes an indication in the header of the message that the NAK was received and saves the message for later transmission.

Returning to step 60, if IMCS 36A determines that an indication of a previously received NAK for a message to the same server is contained in the message header, IMCS 36A enqueues the message in step 62. The enqueued message remains in the queue until an unblocking message is received from IMCS 36B in the receiving processor 10A as a result of buffers becoming available to the server 42 for which the enqueued message was intended. The manner in which such buffers becomes available is described in a later section entitled "Buffer Accounting".

This invention postpones sending of the link level ACK by the SLA 15 until a higher level of software, i.e. IMCS, has had the opportunity to check the availability of buffers. The communications link 12 is held busy while this check is made, which would not be the case with a hardware link level ACK. However, the total communications system is more efficient and simpler, since there is no need for the higher levels to send messages of the type "I had to discard your last message" or "I had buffers for your last message."

MESSAGE FORMAT

Figure 6B:
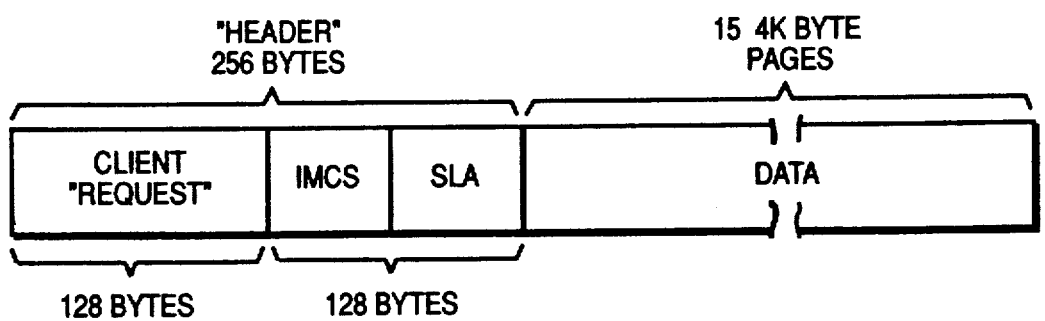
FIG. 6B illustrates the data structure of the message as it is transmitted over the communications link.

The format of the message within a sending processor is shown in FIG. 6A and its format while in transmission over link 12 is shown in FIG. 6B. The format of the client "request" is specific to the operation being performed. In particular, the location and meaning of any data pointers contained in the "request" is known only by clients and servers. In the method of the present invention, this issue is partially solved by adopting a format convention whereby the first 256 bytes or "header" of each single message contains control information. The "header" typically contains a client "request block" area in the first 128 bytes of the message. The contents of this request have meaning only to the client and server and, therefore, are immaterial to IMCS. The second 128 bytes of the header contains control information for IMCS and the serial link adapter. If the "client request" block of the header is greater than 128 bytes, the client and server have to establish a convention for placing the overflow in the data portion of the message.

The remainder of the solution is to require the client to prepare the IMCS and SLA portions of the header. The header may be followed by one or more 4 Kbyte data pages in any given transmission. The data page maximum allowed is fifteen data pages, although a different maximum number of pages may be suitable depending on the particular configuration and/or use of the system.

Since the entire message will be sent in one transmission, tag words to describe all the elements of the message must be built and placed in the SLA portion of the header, including tag words for the data. The elements of the header do not have to be contiguous in virtual or real memory, so long as tag words are correctly built to describe the elements.

In previously described step 54 of FIG. 8 involving the preparation of the message, the "client" builds the "client request" portion, if not previously prepared, and the IMCS portion of the header is prepared using a client-supplied "prepare for IMCS" routine. The "prepare for IMCS" routine understands the data structure of the "request" block, especially the whereabouts of the data pointers and fills in the tag word image area for the header and outgoing data. The client also fills in the IMCS control area, which specifies information such as the destination, e.g. specific server in designated receiving processor 10B, a list of the data pages to be sent (which pages must be pinned) and a notification routine 46 in the sending processor 10A to be called when the transfer has been completed. The data structure may be written in "C" (as they are below) or in another suitable language.

The data structures of the "request" block may be as follows:

```
© 1988 IBM Corporation
   struct tag {
      unsigned pageno:  21;
      unsigned offset:   5;
      unsigned:          1;
      unsigned cound:    5;
   };
   struct imcs_header {
/*****************************************/
/* The user area contains the protocol   */
```

```
/* which the two communicating parties  */
/* employ. IMCS does not look at this    */
/* area, nor change it. For the RTSI     */
/* protocol the user area is mandatory   */
/* and the first tag word must point to  */
/* it. For the other protocols, it is    */
/* optional.                             */
/****************************************/
        char user_request_block[128];
/****************************************/
/* This area is the imcs request proper. */
/* It describes the I/O operation to be  */
/* performed; the action to be taken at  */
/* the completion of the operation. For  */
/* the RTSI protocol, the first half of  */
/* the request block is shipped and the  */
/* second tag word must point to it. At  */
/* the receiver of the RTSI, the header  */
/* is overlaid with the user_request_    */
/* block and the first half of the imcs  */
/* request block. For the other pro-     */
/* tocols, it is not shipped.            */
/****************************************/ char_user_message_area[20];
/****************************************/
/* This area contains data which allows  */
/* the correlation of responses. The     */
/* fields are suggestions, not prescrip- */
/* tions.                                */
/****************************************/

/****************************************/
/* imcs area 12 bytes                    */
/****************************************/ short dest_proc_token;
        short dest_imcs_qtoken;
        short send_status;
            /* imcs reports outcome */
        short send_msg_len;
            /* in bytes */
        (*notify_address) ( );
            /* @ called at xmit end */

/****************************************/
/* This area contains data which allows  */
/* IMCS and the channel device driver to */
/* communicate.                          */
/*                                       */
/* char imcs_cdd_area[32]                */
/****************************************/
        struct imc_header *imcs_chain_word;
            /* for queuing */
        struct imcs_header *cdd_chain_word;
            /* for queuing */
        struct imcs_header *next_queue_chain;
            /* for queuing */
        short imcs_dest_proc;
            /* actual processor */
        short imcs_dest_qtoken;
            /* actual gid */
        short imcs_send_proc;
            /* sending processor */
        short imcs_send_subch;
            /* sending subchannel */
        short imcs_rcv_subch;
            /* subch to send to */
        short imcs_rcv_msglen;
            /* received msg length */
        short imcs_op;
            /* send or rcv */ define/IMCS_SEND_CODE    1
define/IMCS_RCV_CODE     3
        unsigned short imcs_go;
#define/IMCS_IMMEDIATE    0x8000
        long reserved;
define/NUM_TCWS          16 union tags  {
            long tagwords [NUM_TCWS];
            struct tag tag [NUM_TCWS];
        } tags;
    };
    struct imcs_header *imcs_header;
```

The header (which may be composed of 2 discontiguous 128-byte chunks) is allocated from the virtual storage segment 41 assigned for kernal data. The headers must all be in the same segment when using the 801 addressing architecture so that short (32 bit) addresses may be used for pointers. The header (and the data pages) must be pinned before IMCS is called. The following fields in the header must be supplied:

imcs —dest —proc — the processor to which the message is to be sent. IMCS validates this and chooses a route. If the processor exists, but is not available, IMCS queues the message.

imcs—dest—qtoken the queue identification representing the server at the receiving processor to which the message is to be sent. IMCS does not validate this.

notify—address the address of a routine which is called by IMCS from the interrupt handler when the transmit operation is complete. This routine is in the kernel text segment and pinned.

tags these must be filled in to represent the header and associated data pages. A system service takes a virtual address and length and returns a tag word.

Once the message has been prepared by the client, the client calls IMCS. IMCS sends the message unless the processor to which the message is to be sent is not within the group of processors IMCS communicates with. If not within the group, IMCS generates an "error" return code.

In the event the message is to be queued for later transmission, IMCS employs a hashing scheme to insure that the enqueued message will be sent to the right queue in the receiving processor in the right order when the transmission actually occurs. This scheme is necessary to prevent messages arriving out-of-order, which could happen if two physical communication links are available between the sending and receiving processor or if the receiving processor 35 has NAKed a previous message for the same queue.

BUFFER ACCOUNTING

IMCS 36 in each processor includes a buffer accounting mechanism 48 to ensure that a particular receiving component does not use up too many frames in the processor. The mechanism 48 does separate accounting for the header and data pages.

Servers in the receiving processor 10 contribute buffers to the data buffer pool 43, and a buffer account is maintained by the accounting mechanism 48 for each server. When a message arrives for a particular server, its account is decremented appropriately. The account may be replenished by contributing more buffers.

A problem arises when a message arrives for a server whose account is not sufficient to accept it, although the total number of free buffers contributed by all the servers is large. Since the server's shortfall may be temporary, it may be better to 'lend' it tree buffers from the global pool, rather than to refuse the message for it.

Each potential recipient server has an "account" of fixed pages for incoming messages from other processors 10 in the cluster. There is a notion of "service class", with different buffer policies for each class. Each server in a unit belongs to one class. In the "strict" class, the servers cannot overdraw their accounts. In the liberal class, servers may overdraw (i.e. use each other's buffers). The liberal class provides a type of global buffer pool which allows fluctuations while maintaining less buffer space than would be required for the maximum needs of all the participating servers. However, in no case can buffers from the strict class be "borrowed" by the liberal class.

In order to contribute to an account, a server calls a routine in IMCS which gives frames of memory to the buffer account for a particular server queue. This routine is a VMM call that runs at the VMM's priority level. If there is resource control by VMM 31, it makes sure that the server is entitled to the requested number of frames. If the system is out of frames, the VMM gives an error return. In the non-error case, the VMM finds a free frame, makes it not reclaimable, and reserves the frame for IMCS. It then calls an IMCS routine which runs at the SLA's priority level and adds the frame to the SLA buffer pool and increments the server queue's account.

When IMCS 36 in a receiving processor 10 sends a NAK for a given queue, it keeps an indication that it has done so in the server table. At some point the queue's server will replenish the buffer account, and when this happens IMCS 36 sends a message to the processor to which it sent the NAK saying it should resume sending. When IMCS 36 at the sending processor 10 receives this message, it enqueues the first message for that queue to the communications device driver 38, and the queue is thus effectively unblocked. It should be noted that this unblocking message is an IMCS-to-IMCS message. It does not need buffer accounting because it can be processed by IMCS immediately upon arrival.

One of the reasons for the buffer accounting scheme is to prevent resource depletion—it is a mechanism for preventing a client from flooding a server's processor with messages which cannot be processed in a reasonable amount of time.

Another reason is to help in the avoidance of deadlock. For instance, a processor 10 may have no free page frames and no free headers, so it cannot receive any messages. The next incoming message would allow it to free a page frame, but since it cannot allocate any new headers it cannot receive this message. The buffer accounting scheme enables the virtual memory manager 31 to limit the number of page frames given out for IMCS's use, without preventing a specific server from receiving messages. Since the number of server queues is essentially unlimited, a server may in fact have more than one queue to separate its incoming messages in some way. For instance, the virtual memory manager 31 might have one queue to receive page-in requests from clients and another queue to receive responses to its own page-out requests. Without this, a page-out response could get queued up behind a number of page-in requests in a queue which is blocked, causing the kind of deadlock described.

HEADER MANAGEMENT

When the server in the receiving processor informs IMCS 36 of its existence, the server specifies the number of headers it can use for its queue. The number represents the upper limit on the number of concurrent requests that the server will service. There is no point building up long service queues, it is better to have the requests wait in the sending processors (where they are already using real memory resources).

The headers are managed by IMCS. At initialization, it allocates a page from kernel data space, breaks it conceptually into sixteen 256 byte headers, and pins the headers. Each time a set of tag words is build for the SLA 15 to use in a receive operation, one of these headers is given to it. When a message comes in, the header is given to the server to which the message is addressed and the servers' header account is decremented. Eventually, the server completes the request, or it may, before servicing the request, copy relevant information from the header into its private data area. In either case, it returns the header to IMCS. At this time, the header account of the server's queue is incremented, and the header goes back to IMCS's header pool, for reuse in another incoming message.

IMCS may run low on headers. When the number of free headers falls below a threshold, 4 for example, IMCS allocates another page, and adds the headers thus gained to its header pool. Allocating a header page must be done in a process, since pinning the page may cause a page fault.

When a message arrives for a queue whose header account is zero, IMCS sends a NAK which can be distinguished from the 'no data buffers' NAK. In the "no header" NAK case, instead of waiting for an IMCS message to unblock the queue, the sender IMCS can resend after a short while. This is because a shortage of headers may be a more transient phenomenon. Although different schemes may be used for headers and buffers, it is not essential to do so.

QUEUE TOKEN MANAGEMENT

As has been stated, the server 42 whose services are requested by a client is identified in the message header by a queue token. There are various possibilities for assigning these tokens. For instance, system services such as the VMM may have "well known" token values which are the same in all processors. Other values are assigned by IMCS and communicated between servers and clients by their own mechanisms, which are not part of the present invention.

SLIH EXTENSION

IMCS identifies the server from the dest—qtoken field in the message header, and calls the server's SLIH extension 44 in the interrupt handler environment. It is up to the SLIH extension 44 to communicate the existence and location of the message to its server. The SLIH extension 44 has access to the server's internal state and its data structures, and knows, for instance, whether an incoming message is to be queued somewhere, whether a process needs to be posted, etc.

For instance, if the request is for a page-in, i.e. a request to send a page from the server to the client, the SLIH extension 44 might look to see if the requested page is in memory. If so, it could service the request immediately, using the incoming message's physical space for its outgoing response message. If the page were not in memory, it would have to be fetched from another system or disk, both slow operations. So the SLIH extension would schedule the service for later processing.

INTERMEDIATE NODE ROUTING

In a cluster with a switch 11, any two processors 10, 10A and 10D for example, connected to the switch 11 may make direct connections with each other. In the absence of a switch 11, or if a processor 10 is not connected to it, it may be necessary for two processors 10A and 10D to communicate with each other through one or more intermediate processors, 10B for example, as shown in FIG. 3. This is called intermediate node routing (INR).

A fundamental problem in communications is whether a receiving processor 10D has enough buffer space to accommodate an incoming message. In the intermediate node routing case, the intermediate processor 10B may have buffer space, but not the destination processor 10D, or vice versa.

When processors 10A and 10D are directly connected, ACKs and NAKs are used to communicate the availability of buffers. This is not possible in the INR case because the ACKs and NAKs communicate the availability of buffers in the intermediate processor.

If the intermediate processor 10B tells the sending processor 10A that it has buffer space, when it finds that the destination processor 10D does not have space, it is obliged to hold the message in its buffers, which causes considerable burden both in terms of buffer space and in terms of management.

Two alternative solutions have been developed to resolve this problem. Both solutions recognize that what is considered the normal case (no INR) should not be compromised by the INR case solution.

In one alternative, the serial link(s) 12 may be exploited to make a connection through the intermediate processor 10B. Specifically, when a message arrives at an intermediate processor 10B destined for another processor 10D, the incoming serial link 12 is held connected until the message has been delivered onto another serial link 12 to processor 10D. Processor 10D then sends an ACK or NAK, as appropriate, on link 12 to processor 10B and processor 10B then forwards this NAK or ACK onto the link 12 to processor 10A.

More specifically, before the intermediate processor 10B sends the software ACK (meaning it has received the message in its own buffers), processor 10B attempts to forward the message to the destination processor 10D. If the destination processor 10D has no buffer space, it sends a NAK to processor 10B. So the intermediate processor 10B discards the message and sends a NAK to the originating processor 10A.

If the destination processor 10D sends an ACK, the intermediate processor 10B discards the message and sends an ACK to the originating processor 10A. In either case, the buffer at the intermediate processor 10B is freed up to accept another message.

This design keeps the communications medium between communicating processors 10A and 10B busy until the destination processor 10D responds. However, this is a reasonable tradeoff given the alternative of having more complex software and more buffer space in the intermediate processor. It should be noted that this design can be extended to more than one intermediate processor.

Alternatively, an IMCS to IMCS connection service may be built on top of the normal IMCS. ACKs and NAKs are then sent as messages on this connection, just like the real messages between clients and servers. This embodiment has higher development cost than the previous one.

In the directly connected case, IMCS is called and sends a message to a service queue at the receiving processor (the destination service queue). In the INR case, IMCS is called and it queues the message to a local IMCS Connection Service. This connection is in session (through the intermediate processor) with a counterpart on the destination processor.

The message is passed through the intermediate processor to the IMCS connection service at the destination processor. The IMCS connection service passes it on to the destination service queue. This may fail due to the lack of buffers. The IMCS connection service at the destination processor sends a message indicating the success or failure to the IMCS connection service at the originating processor.

The IMCS connection service at the originating processor does not send any subsequent message to the same queue in the destination processor ("destination queue") until it has received an ACK from the destination IMCS connection service. If it receives a NAK, it waits for a subsequent unblocking message before sending to that destination queue.

The messages between the connection services have to get through, so the processors have to reserve space for those, but only one such message is flowing at a time. Furthermore, temporary buffers are required at the receiving IMCS connection service to hold the incoming message before passing it to the destination queue. However, at the intermediate processor buffer space is only needed for the time it takes to receive the message off one serial link and send it out on another.

It should be noted this mechanism allows only one message for a given destination queue to be in flight at one time. It can be improved if the IMCS connection services give sequence numbers, a separate sequence per queue. In this case, when a NAK is received, it specifies a particular message. The IMCS connection service at the sending processor may have several outstanding messages in flight; it knows where to restart when the queue is unblocked. The connection service at the receiving processor discards messages with a sequence number greater than the one it NAKed. Later, when the queue is unblocked, they will be resent by the sending processor.

While the invention has been particularly shown and described with reference to the preferred embodiments, it will be understood by those skilled in the art that various other changes in form and detail may be made without departing from the spirit and scope of the invention.

We claim:

1. A system for determining sufficiency of buffer space when communicating between a plurality of processors, including a receiving processor and a sending processor, connected in a network, comprising:

means for sending a message, intended for a receiving component of said receiving processor, from a component of said sending processor to said receiving processor;

means for receiving said message, by said receiving processor, into a preprocess buffer of said receiving processor;

means for dynamically determining by a preprocess component of the receiving processor, upon receipt or said message at aid preprocess buffer in the receiving processor, whether said receiving component has buffer space available for said message; and means for acknowledging, by the receiving processor to the sending processor that the message was received by the receiving processor, said means for acknowledging further comprising means for notifying the sending processor of the determination made by the means for dynamically determining.

2. The system of claim 1, further comprising:

means for notifying the receiving component by the preprocess component of the message if buffer space is determined to be available, and means for performing some immediate processing by the receiving component in response to said message.

3. The system of claim 1, wherein said preprocess buffer comprises both a control segment and a data segment.

4. The system of claim 3, wherein: the control segment comprises a portion of said received message which identifies an action which the receiving component is to perform.

5. The system of claim 3, wherein said determining means further comprises:

means for separately determining that sufficient buffer space is available for the control segment of the message and that sufficient buffer space available is for the data segment of the message.

6. A system for communicating between a plurality of processors connected i a network, comprising:

means for sending a message, from a component of a sending processor, to an intended component of a receiving processor within said plurality of processors;

means for receiving said message, by said receiving processor, into a preprocess buffer of said receiving processor;

means for dynamically determining by a preprocess component of the receiving processor, upon receipt of said message at said preprocess buffer of the receiving processor, an availability of intended component buffer space to contain said message for said intended component;

means for indicating, by the receiving processor to the sending processor that the message was received by the receiving processor; and means for notifying the sending processor, through said indicating means, of the determination made by the means for dynamically determining.

7. The system of claim 6, further comprising:

means for queuing the message at the sending processor, without notice to the sending component, when the message was not received by the receiving component.

8. The system of claim 7, further comprising:

means for notifying the sending processor, by the receiving processor, when buffer space becomes available to the receiving component; and means for sending the queued message to the receiving processor, without notice to the sending component.

9. The system of claim 7, further comprising:

means for queuing a plurality of subsequent messages intended for the receiving component from the sending processor before said subsequent messages are sent to said receiving processor.

10. The system of claim 9, further comprising:

means for sending the queued message and subsequent messages to the receiving processor in the same order as sent from any sending component in said sending processor as buffer space is available for messages to the receiving component in the receiving processor.

11. A system for communicating between a plurality of processors connected in a network, comprising:

means for sending a message, having a control segment and a data segment, from a component of a sending processor to an intended component of a receiving processor within said plurality of processors;

means for receiving said message, by said receiving processor, into a preprocess buffer of said receiving processor;

means for dynamically determining by a preprocess component of the receiving processor, upon receipt of said message at a preprocess buffer of the receiving processor, an availability of buffer space of said intended component for said control segment and for said data segment of said message;

means for notifying, by the receiving processor to the sending processor, that buffer space was unavailable; and means for identifying to the sending processor if at least one of said data segment and control segment had unavailable buffer space.

12. A system for facilitating communications between a plurality of components in a plurality of processing systems connected in a network, said system comprising:

means for allocating buffer space to each of said components;

means for classifying at least one set of components into one of a plurality of class types;

means for pooling said allocated buffer space by said class types;

means for sending a message, intended for a receiving component of a receiving processor, from a component of a sending processor to a receiving processor;

means for dynamically determining by said receiving processor, upon reception of said message at the receiving processor, whether said receiving component has buffer space available for said message; and means for allocating a buffer, from said pool of buffers, for said sent message if buffer space is unavailable for said receiving component.

13. The system of claim 12, wherein said means for allocating a buffer further comprises:

means for limiting the number of buffers available at a given time to said intended receiving component from said pool of buffer space.

14. The system of claim 12, wherein said means for allocating a buffer further comprises:

means for preventing the use of buffer space from said pool by the intended receiving component if the amount of available buffer space in said pool reaches a predetermined minimum amount.

15. The system of claim 12, wherein said classifying means further comprises:

means for classifying one of said components into a separate class if said allocated buffer space is to be reserved for said one component.

16. A method for determining sufficiency of buffer space when communicating between a plurality of processors, including a receiving processor and a sending processor, connected in a network, comprising:

sending a message, intended for a receiving component of said receiving processor, from a component of said sending processor to said receiving processor;

dynamically determining, at the time the message is received at the receiving processor, whether said intended receiving component has buffer space available for said message; and acknowledging to the sending processor that the message was received by the receiving processor, said acknowledging further comprising notifying the component of the sending processor of the determination by the receiving processor that sufficient buffer space was available at the receiving processor for the receiving component to receive the message when it is determined by the preprocess component that intended component buffer space is available to contain said message for said intended component.

17. The method of claim 16, further comprising:

notifying the receiving component by the receiving processor of the message if buffer space is determined to be available, by performing some immediate processing by the receiving component in response to said message.

18. A method for communicating between a plurality of processors connected in a network, comprising:

sending a message, from a component of a sending processor, to an intended component of a receiving processor within said plurality of processor;

receiving said message, by said receiving processor, into a preprocess buffer of said receiving processor;

dynamically determining by a preprocess component of the receiving processor, upon receipt of said message at said preprocess buffer of the receiving processor, an availability of intended component buffer space to contain said message for said intended component;

indicating, by the receiving processor to the sending processor that the message was received by the receiving processor; and notifying the sending processor of the determination made of the availability of intended component buffer space when it is determined by the preprocess component that intended component buffer space is available to contain said message for said intended component.

19. A method for communicating between a plurality of components in a plurality of processing systems connected in a network, said method comprising:

allocating buffer space to each of said components;

classifying at least one set of components into a class type;

pooling said allocated buffer space into a buffer pool by said class type;

sending a message, intended for a receiving component of a receiving processor, from a component of a receiving processor, from a component of a sending processor to a receiving processor;

determining, at the time the message is received at the receiving processor, whether said intended receiving component has buffer space available for said message; and allocating additional buffer space from said pool of said class type of said intended receiving component, for said sent message if existing buffer space is unavailable for said intended receiving component.

20. A system for communicating between a plurality or processors, including a sending processor and a receiving processor, through an intermediate processor, the plurality of processors and the intermediate processor being connected in a network by a plurality of communication links, comprising:

means for sending a message for the receiving processor from the sending processor to the intermediate processor over a first communications link;

means for sending the message from the intermediate processor to the receiving processor over a second communications link;

means for dynamically determining by the receiving processor, at the time the message is received at a preprocess buffer of the receiving processor, whether there is an availability of receiving component buffer space at the receiving processor for the message;

means for acknowledging by the receiving processor to the intermediate processor that there is sufficient receiving component buffer space when it is determined by the receiving processor that receiving component buffer space is available for the message; and means for acknowledging by the intermediate processor to the sending processor, in response to the means for acknowledging by the receiving processor to the intermediate processor, that sufficient receiving component buffer space is available.

21. The system of claim 20, further comprising:

means in the receiving processor for allocating a portion of receiving component buffer space to each of a plurality of components available at the receiving processor, wherein said sending means in the sending processor comprises means for sending a message from a sending component which identifies a receiving component in the receiving processor to receive the message; and said receiving processor acknowledgement means sends an acknowledgement to the intermediate processor only if there is sufficient space in the portion of the receiving component buffer space committed to the identified receiving component.

22. The system of claim 20, further comprising:

means for maintaining the first communications link until (i) transmission of an acknowledgement from the receiving processor to the intermediate processor and (ii) transmission of an acknowledgement from the intermediate processor to the receiving processor are completed.

23. A system for communicating between a plurality of processors, including a sending processor and a receiving processor, through an intermediate processor connected in a network by a plurality of communication links, comprising:

first sending means for sending a message for the receiving processor from the sending processor to the intermediate processor over a first communication link;

second sending means for sending the message from the intermediate processor to the receiving processor over a second communications link;

means for dynamically determining by the receiving processor, at the time the message is received at a preprocess buffer of the receiving processor, whether there is an availability of receiving component buffer space at the receiving processor for the message;

means for acknowledging by the receiving processor to the intermediate processor that there is not sufficient receiving component buffer space at the receiving processor when it is determined by the receiving processor that receiving component buffer space is not available for the message; and means for acknowledging by the intermediate processor to the sending processor, in response to the means for acknowledging by the receiving processor to the intermediate processor, that there is not sufficient receiving component buffer space at the receiving processor.

24. The system of claim 23, further comprising:

means in the receiving processor for allocating a portion of the available buffer space to each of a plurality of components at the receiving processor, wherein said first sending means includes means for sending a message from a component in the sending processor which message identifies a receiving component of the receiving processor to receive the message; and wherein said means for acknowledging by the receiving processor comprises means for sending a negative acknowledgement t the intermediate processor that there is not sufficient space in the portion of the buffer space committed to the identified receiving component.

25. A system for providing remote services between a plurality of processors, including a sending processor and a receiving processor, connected in a network, said system comprising:

means for sending a message, intended for one of a plurality of components of the receiving processor, from a component of the sending processor to the receiving processor;

means for dynamically specifying by the receiving processor to the sending processor that a receiving component has available resources for said sent message;

means for identifying an associated processing action for immediate processing by said receiving component when a sent message arrives at the receiving processor for said receiving component;

means, in the receiving processor, for accessing said receiving component by invoking said associated processing action by said receiving processor upon arrival of said sent message;

means, in the receiving processor, for immediately performing said associated processing action in response to said sent message; and means, in the receiving processor, for deferring other processing actions determined by said intended receiving component.

26. A method for providing remote services between a plurality of processors, including a sending processor and a receiving processor, connected in a network, said method comprising:

sending a message, intended for one of a plurality of components of the receiving processor, from a component of the sending processor to the receiving processor;

dynamically specifying by the receiving processor to the sending processor that a receiving component has available resources for said sent message;

identifying an associated processing action for immediate processing by said receiving component when a sent message arrives at the receiving processor for said receiving component;

accessing, by an interrupt handler in said receiving processor, said receiving component by invoking said associated processing action by said receiving processor upon arrival of said sent message; and immediately performing said associated processing action in response to said sent message, while deferring other processing actions determined by said intended receiving component.

* * * * *